(12) United States Patent
Bryant

(10) Patent No.: US 7,022,243 B2
(45) Date of Patent: Apr. 4, 2006

(54) APPARATUS FOR TREATING STORM WATER

(76) Inventor: Graham Bryant, 129 Linden Ave., Westfield, NJ (US) 07090

( * ) Notice: Subject to any disclaimer, the term of this patent is extended or adjusted under 35 U.S.C. 154(b) by 114 days.

(21) Appl. No.: 10/718,120

(22) Filed: Nov. 20, 2003

(65) Prior Publication Data
US 2005/0109707 A1 May 26, 2005

(51) Int. Cl.
*B01D 17/025* (2006.01)
*B01D 21/02* (2006.01)
(52) U.S. Cl. ............... 210/747; 210/801; 210/804; 210/162; 210/170; 210/253; 210/254; 210/305; 210/532.1; 210/538
(58) Field of Classification Search ............... 210/747, 210/800, 801, 804, 806, 162, 170, 253, 254, 210/299, 305, 521, 532.1, 538, 540
See application file for complete search history.

(56) References Cited

U.S. PATENT DOCUMENTS

| | | | | |
|---|---|---|---|---|
| 357,349 | A | * | 2/1887 | Waring ............... 210/532.1 |
| 3,862,040 | A | * | 1/1975 | Preus et al. ............... 210/254 |
| 4,985,148 | A | | 1/1991 | Monteith |
| 5,498,331 | A | * | 3/1996 | Monteith ............... 210/170 |
| 5,505,860 | A | * | 4/1996 | Sager ............... 210/538 |
| 5,531,888 | A | | 7/1996 | Geiger et al. |
| 5,562,819 | A | | 10/1996 | Turner, Jr. et al. |
| 5,746,911 | A | * | 5/1998 | Pank ............... 210/538 |
| 5,759,415 | A | * | 6/1998 | Adams ............... 210/532.1 |
| 6,062,767 | A | * | 5/2000 | Kizhnerman et al. ....... 210/521 |
| 6,077,448 | A | * | 6/2000 | Tran-Quoc-Nam et al. . 210/800 |
| 6,120,684 | A | | 9/2000 | Kistner et al. |
| 6,303,033 | B1 | * | 10/2001 | Malone et al. ............ 210/170 |
| 6,524,473 | B1 | * | 2/2003 | Williamson ............ 210/532.1 |
| 6,547,962 | B1 | * | 4/2003 | Kistner et al. ............ 210/538 |
| 6,679,994 | B1 | * | 1/2004 | Turco et al. ............ 210/162 |
| 6,783,683 | B1 | * | 8/2004 | Collings ............ 210/532.1 |
| 2002/0175115 | A1 | | 11/2002 | Weaver |

* cited by examiner

*Primary Examiner*—Christopher Upton
(74) *Attorney, Agent, or Firm*—Klauber & Jackson

(57) ABSTRACT

A separation tank having an inlet and an outlet and forming a low flow path and a high flow path, both conveying water from the inlet to the outlet. At normal, low flows, the water enters the inlet and passes through the low flow path having treatment chambers to remove, respectively, heavy materials and floatable materials. At high flows such as with heavy storm runoff, water exceeding a predetermined flow rate is conveyed from the low flow path into the high flow path where there are baffles to treat the water to remove both heavy materials and floatable materials. In optional embodiments, there is a filter/recharge chamber that may contain a filter and/or a groundwater conveyance system such that filtered or unfiltered water can be discharged from the low flow path through a groundwater conveyance system to groundwater, to the normal outlet, or both.

29 Claims, 3 Drawing Sheets

APPARATUS FOR TREATING STORM WATER

TECHNICAL FIELD

The present invention relates generally to a device for treatment of storm water, and, more particularly, to an apparatus that provides treatment to the water both during normal flows and also during the high flows occasioned by a heavy downpour.

BACKGROUND OF THE INVENTION

In the treatment of storm water, it is necessary to remove various undesirable elements and components, such as bacteria, oil, metals, nutrients, trash and a number of other solids. Many of the pollutants bond to the finer sediment and which is the reason many regulatory agencies now focus on total suspended solids (TSS) as a criteria for design/approval of stormwater quality measures.

To that end, the Clean Water Act requires some stormwater quality treatment for all new developments over 0.5 acres in size. Many types of equipment and processes have been suggested for dealing with this problem.

One of the difficulties in the removal of such materials from stormwater is the need to take into account different flows of that water. For example, under normal conditions, there may be a steady, relatively low flow of water that passes through the treatment facility, while at other times, there is a heavy storm with rapidly rising flow rates and, therefore, the stormwater treatment facility needs to also be able to treat that high flow of water.

The treatment devices need to be capable of removing debris and undesirable liquids, such as oil that floats on the surface of the water under both flow conditions efficiently and at a low cost of the equipment.

Accordingly, there have been various stormwater treatment devices that provide for the conveyance of the high flows and the low flows by creating a bypass for the high flow of the water so that the high flow does not pass through the same treatment facilities as the low flow of water. In such treatment facilities, however, the high flow that bypasses the low flow treatment chambers is not normally treated to remove both floating and non-floating materials.

One of such stormwater treatment devices is shown and described in U.S. Pat. No. 4,985,148 of Monteith. In the stormwater treatment device of that patent the bypass stream of the high flow water is not treated for the removal of floating and non-floating materials. Accordingly, while the Monteith system does consider conveyance for the high flow stream of water from a heavy runoff, that bypass water simply passes though the apparatus without any treatment and thus undesirable floatable and non-floatable materials in the high flow stream can be conveyed downstream without being removed.

Thus, there is a desire for an efficient and cost effective means for trapping debris in storm water that overcomes the difficulties of the aforedescribed stormwater treatment devices and yet which is effective at trapping both floating and non-floating particulate matter. Such an apparatus should be simple in its design and be able to be produced at low cost.

The device should be flexible in varying field conditions, i.e., able to satisfy varying size and height requirements and be able to connect efficiently to the non-linear junction points that inevitably occur in piping systems.

SUMMARY OF THE INVENTION

Thus, in the present invention, there is a stormwater separation tank that includes a container having a bottom, side walls and a cover to enclose the tank for treatment of the storm water. An inlet and an outlet are provided to receive and discharge water, respectively. Within the container, there is formed a low flow path for the water and a high flow path, both treating water that passes through the container from the inlet to the outlet. The various paths are preferably constructed by means of a plurality of partitions that are affixed therein and which divide the container into various chambers, that is, there is a first treatment chamber, a second treatment chamber, a high flow treatment chamber and an outlet chamber.

By means of the partitions, there is a separation of the various chambers, however, the partitions also control the flow path of stormwater between the chambers allowing both low or normal flows, and high flows, to be treated in separate areas of the separation tank.

The inlet to the container is formed in one of the sidewalls where that inlet receives the water to be treated and that water passes through the inlet directly into the first treatment chamber. During normal flow conditions, the water that enters the first treatment chamber passes through one or more openings in a partition that separates the first treatment chamber from the second treatment chamber. By means of the vertical location of the one or more openings, the larger particles and non-floatable materials cannot pass through the one or more openings and therefore remain in the first treatment chamber, thereby separating out those materials from the stream of water being treated.

The second treatment chamber, likewise, has a partition that separates the second treatment chamber from the outlet chamber, and there is a means to separate out floatable liquids, such as oil, from the stream of water as it passes from the second treatment chamber to the outlet chamber. Thus, there are one or more standpipes that extend from openings in that partition downward into the second treatment chamber so that the lowered extensions or inlets to the standpipes are located beneath the level of the water in the second treatment chamber. As such, the water that passes from the second treatment chamber to the outlet chamber is drawn from below the surface of the water in the second treatment chamber which prevents the floating liquids, such as oil, from passing out of the second treatment chamber so that the second treatment chamber effectively removes the floatable liquids, such as oil, from the stream of water passing through the separation tank.

The outlet is also provided in one of the side walls and allows the treated water to pass from the outlet chamber out of the separation tank.

As indicated, there is also a high flow treatment chamber formed within the container and a partition separates the first treatment chamber from the high flow treatment chamber. There is a weir provided in that partition such that with the high flow of water, caused by excessive runoff, the height of the water in the first treatment chamber rises and eventually overflows the weir formed in that partition so that the high flow enters the high flow treatment chamber where it proceeds to the outlet chamber and is, therefore, not treated in the second treatment chamber.

The high flow stream of water is treated as it passes through the high flow treatment chamber by means of a pair of baffles. The high flows that overflow the weir between the first treatment chamber and the high flow treatment chamber pass under a high baffle in order to remove floating liquids, such as oil, and the high flows further continue and pass over a low baffle where heavy materials and large particles are prevented from passing over that baffle and, therefore, those heavier materials are removed from the high flow stream of water prior to that stream of water entering the outlet chamber and passing, ultimately, out of the separation tank.

Thus, by the use of the present stormwater treatment tank, at normal water flows, the water passes sequentially through a first and a second treatment chamber, where, respectively, heavier materials are removed and floating materials are removed such as oil, before the treated water is conveyed to the outlet. In the event of high flows, such as during a large storm, the high flow of water causes the level of the water in the first treatment chamber to rise to the point where it overflows a weir formed in a partition separating the first treatment chamber from the high flow treatment chamber.

That high flow stream thereby does not enter the treatment area normally carried out in the second treatment chamber and proceeds through the high flow treatment chamber to the outlet and, during that progress, is treated in the high flow treatment chamber to remove both heavier materials as well as floating materials such as oil and floating trash.

In an alternative embodiment, and which is optional, there can also be a filter/recharge chamber provided that receives the water from the second treatment chamber and which has, therefore, been treated by both the first and second treatment chambers. In the filter/recharge chamber, the water is filtered as it passes through a filter and then is discharged out of the water treatment tank, after the filtration, to the normal ground water to aid in maintaining a desired level of groundwater and to reduce storm water runoff volume to aid in maintaining the pre-development hydrology.

As alternate embodiments, the water can simply move directly from the second treatment chamber to the outlet chamber; it can pass through a filter to the outlet chamber, it can pass through a filter to be discharged through a groundwater conveyance system, or can proceed directly to the groundwater conveyance system without passing through any filter. There may also be a combination of the foregoing alternatives where a partial stream may be split and one split stream proceeds to the outlet chamber while the other split stream can pass to the groundwater conveyance system, either though a filter or directly to that groundwater conveyance system.

These and other features of the present invention will become apparent upon review of the following detailed description of the present embodiments of the separation tank, when taken in conjunction with the drawings and the appended claims.

DETAILED DESCRIPTION OF THE INVENTION

Figure 1:
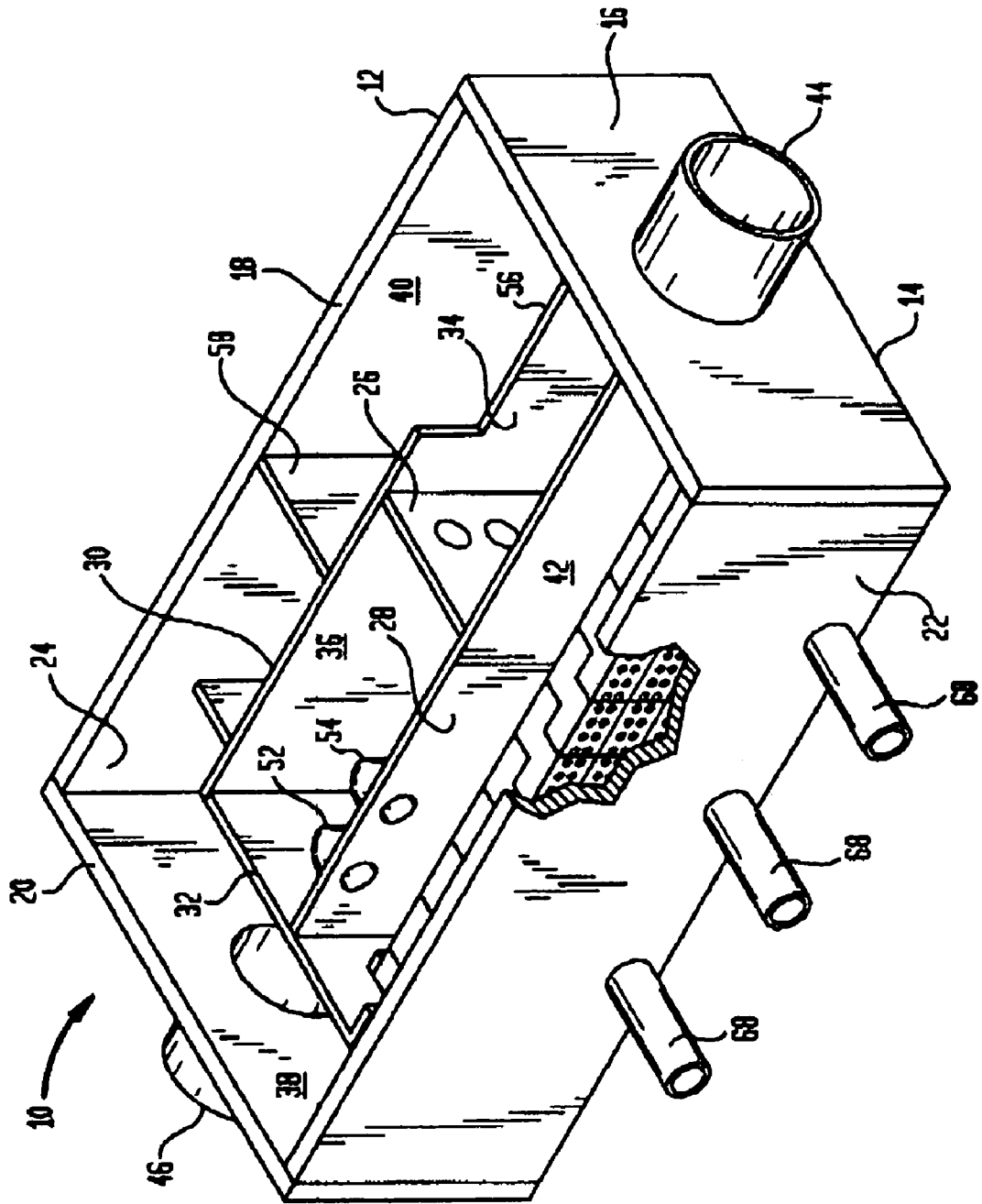
FIG. 1 is a perspective view, partially cutaway, showing the separation tank of the present invention.

Referring now to FIG. 1, there is shown a separation tank 10 that comprises a container 12 having a bottom 14 and four side walls 16, 18, 20 and 22 that form a generally rectangular enclosure that also includes a cover 24 that is basically designed to cover that enclosure and is normally affixed to the upper ends of each of the side walls 16, 18, 20 and 22. The side walls 16, 18, 20, 22 bottom 14 and cover 24 can be constructed of a solid building material such as, but not limited to, concrete or metal.

Within that enclosure, there are located a plurality of partitions that divide the interior of the container 12 into a plurality of chambers and, as can be seen, those partitions are identified as a first partition 26, a second partition 28, a third partition 30 and a fourth partition 32.

Thus, the plurality of chambers that are formed by the partitions 26, 28, 30 and 32 are a first treatment chamber 34, a second treatment chamber 36, an outlet chamber 38, a high flow treatment chamber 40 and a filter/recharge chamber 42. Each of the aforesaid chambers has a different function in the overall construction and use of the separation tank 10 as will be later explained.

An inlet 44 is formed in the side wall 16 to receive the flowing water to be treated. The inlet 44 may be constructed with any piping materials commonly known in the art, e.g., concrete, aluminum, steel, PVC, HDPE, or other like materials and can be sealed to the side wall 16 by methods commonly known in the art, including the use of rubber boots, concrete grout, or similar types of materials or methods. As can be seen, the water passing through the inlet 44 enters the first treatment chamber 34.

An outlet 46 is also formed in the side wall 20 to discharge the water from the separation tank 10 after that water has been treated and, in the embodiment shown, with the separation tank 10 formed as a rectangular structure, the inlet 44 and the outlet 46 can be located in opposite side walls 16, 20 which are, of course, parallel to each other. As alternates, the outlet 46 can be formed in an adjacent side wall, such a side wall 22 or 24, so that the water will traverse a right angle when passing through the separation tank 10. Again like the inlet 44, the outlet 46 is preferably a pipe constructed of the same or similar material as the inlet 44 and is sealed to the side wall 20 in the same manner.

Figure 2:
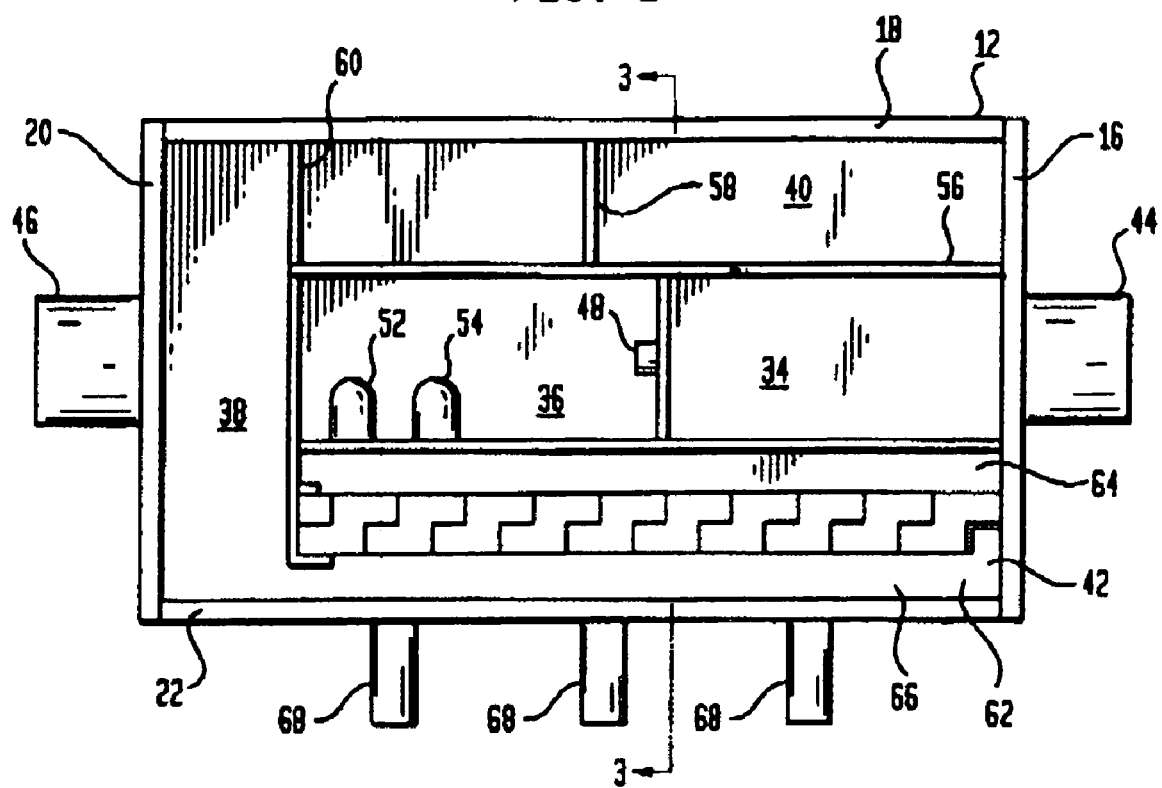
FIG. 2 is a top plan view of the separation tank of the present invention with its cover removed.
Figure 3:
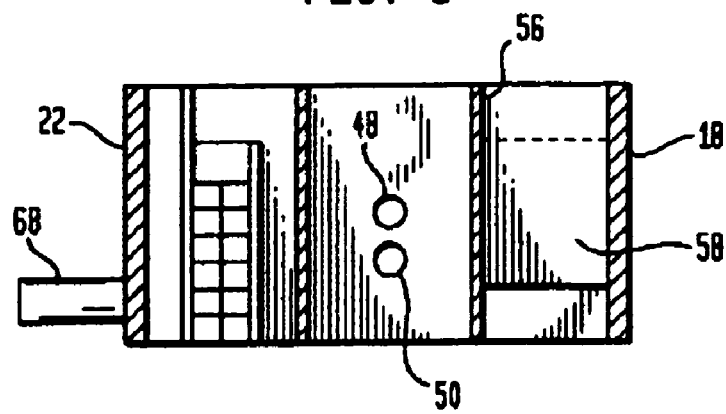
FIG. 3 is a cross-sectional view taken along the line 3—3 of FIG. 2.

Taking, therefore FIGS. 2 and 3, along with FIG. 1, the functions of the various chambers can be better explained. FIG. 2 is a top view of the container 12 and FIG. 3 is a cross sectional view of the container taken along the line 3—3 of FIG. 2.

Accordingly, there are one or more openings that are formed in the first partition 26 to allow the water to pass from the first treatment chamber 34 to the second treatment chamber 36 and preferably there are at least two openings, with one vertically spaced above the other, and those openings may be in vertical alignment such as is shown as an upper opening 48 and a lower opening 50.

There is also a means of liquid transfer between the second treatment chamber 36 and the filter/recharge chamber 42 and that means comprises at least one standpipe, and preferably, a pair of standpipes 52, 54 that are curved pipes having their upper ends affixed to openings in the second partition 28 and lower inlet ends that extend down a predetermined distance into the second treatment chamber 36.

It should be noted that the present description of the inventive apparatus includes the presence of the filter/recharge chamber 42, however, the filter/recharge chamber

42, as explained, is an optional embodiment and, therefore, if the filter/recharge chamber 42 were not present, the flow of water from the standpipes 52, 54 would pass directly into the outlet chamber 38 and thereafter be discharged from the separation tank 10 through the outlet 46. In addition, while the filter/recharge chamber 42 will be referred to as a filter/recharge chamber, it is basically a chamber where there may or may not actually be a filter present in accordance with the different embodiments and it may or may not discharge water to recharge the surrounding water table, however, the filter/recharge chamber 42 is referenced with that name since it is capable of having filters and capable of discharging water into the groundwater in certain embodiments.

As such, the apparatus can now be described with respect to the normal flow of storm water runoff. The water enters the separation tank 10 through the inlet 44 and directly enters the first treatment chamber 34. As the water rises, it flows through the lower opening 50 and then through the upper opening 48 to pass into the second treatment chamber 36. By the vertical location of the lower opening 50, the first treatment chamber 34 captures heavy material in that stream of water at the bottom of the first treatment chamber 34 and is, therefore, removed from the stream of water since those heavy materials cannot rise to the vertical height of the lower opening 50.

That water thereafter passes from the second treatment chamber 36 into the filter/recharge chamber 42, or, as explained, into the outlet chamber 38 if the filter/recharge chamber 42 is not utilized. By means of the standpipes 52, 54, however, the lower, inlet ends of the standpipes 52, 54 are situated below the surface of the water in the second treatment chamber 36 such that the floating materials, such as oil, remain in the second treatment chamber 36 and those materials do not pass into the filter/recharge chamber 42 or outlet chamber 38, as the case may be. In any event, the water, not recharged as groundwater continues into the outlet chamber 38 and is discharged from the separation tank 10 through the outlet 46.

Accordingly, as can be seen, under normal flow conditions, as the water passes from the inlet 44 to the outlet 46, it passes through the first treatment chamber 34 where heavy materials are removed and then through the second treatment chamber 36 where lighter, floatable materials, such as oil, are removed such that the water is treated and both types of materials have been removed by the time the water exits the separation tank 10.

In the event of a heavy storm where there is a high flow of storm water, the separation tank 10 of the present invention also functions to convey the additional flow of water into a separate high flow treatment chamber so as to circumvent the second treatment chamber 36 thereby preventing any scour or resuspension of previously captured material from the second chamber and filter/recharge chamber. Instead, as can be seen in FIGS. 1–3, there is a weir 56 formed in the third partition 30 that is at a predetermined height so that the high flow of water entering the first treatment chamber 34 will overflow the weir 56 upon reaching a certain height in the first treatment chamber 34 and pass into the high flow treatment chamber 40.

Accordingly, with a very high flow of water, such as occasioned by a heavy storm, the water will enter the first treatment chamber 34 and be unable to pass through the upper and lower openings 48, 50. That water will then rise to the point that it reaches the level of the weir 56 and then spill over into the high flow treatment chamber 40 where it can pass to the outlet chamber 38 and ultimately to the outlet 46.

The high flow of water is treated as it passes through the high flow treatment chamber 40 to also remove heavy, non-floatable materials as well as the lighter floatable materials. That treatment is provided by means of a high baffle 58 such that the high flow stream of water must flow underneath the high baffle 58 so as to prevent floatable material from passing through the high flow treatment chamber 40 and thereafter a low baffle 60 that requires the high flow stream of water to flow over the low baffle 60 so that the heavy debris and materials cannot flow over the low baffle 60 and, therefore, remain at the bottom of the high flow treatment chamber 40.

Thus the high flow treatment chamber 40 carries the high flows that overflow the weir 56 directly to the outlet chamber 38 and the outlet 46 while, at the same time, treats that water for the removal of both heavy debris as well as lighter floating materials such as oil.

Finally, the filter/recharge chamber 42 will be explained, and as indicated, the use of that filter/recharge chamber 42 is an alternative embodiment that is an optional, but desirable feature of the present invention. Therefore, as shown in FIG. 2, there is a filter 62 that spans the length of the filter chamber 42 creating an upstream side 64 and a downstream side 66 such that the water from the second treatment chamber 36 passes through the filter 62 from the upstream side 64 to the downstream side 66 where the water can thereafter pass to the outlet chamber 38 and to a groundwater conveyance system, such as, for example, a series of perforated ground pipes 68. Alternatively, the groundwater conveyance system can be one or more solid pipes or may be simply holes in the side wall 22.

As can be seen, the water that passes through the filter 62 to the downstream side 66 can also pass to the outlet 46 via the outlet chamber 38 in the event the water has saturated the ground water and therefore the flow through the groundwater conveyance system is reduced or terminated. In such cases, therefore, the water simply passes through the outlet 46 in the normal course of the use of the treatment tank 10.

Figure 4:
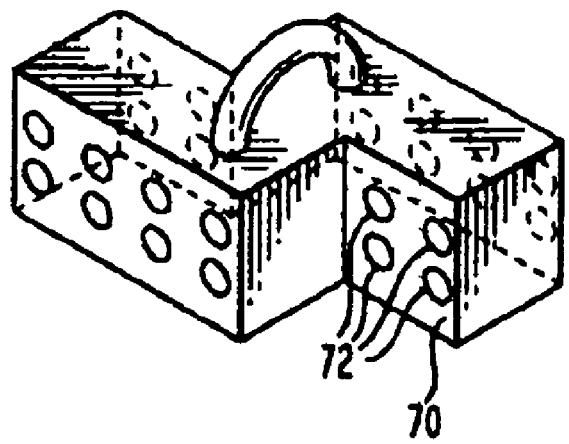
FIG. 4 is a perspective view of a filter block that is used in an optional embodiment of the present invention.
Figure 5:
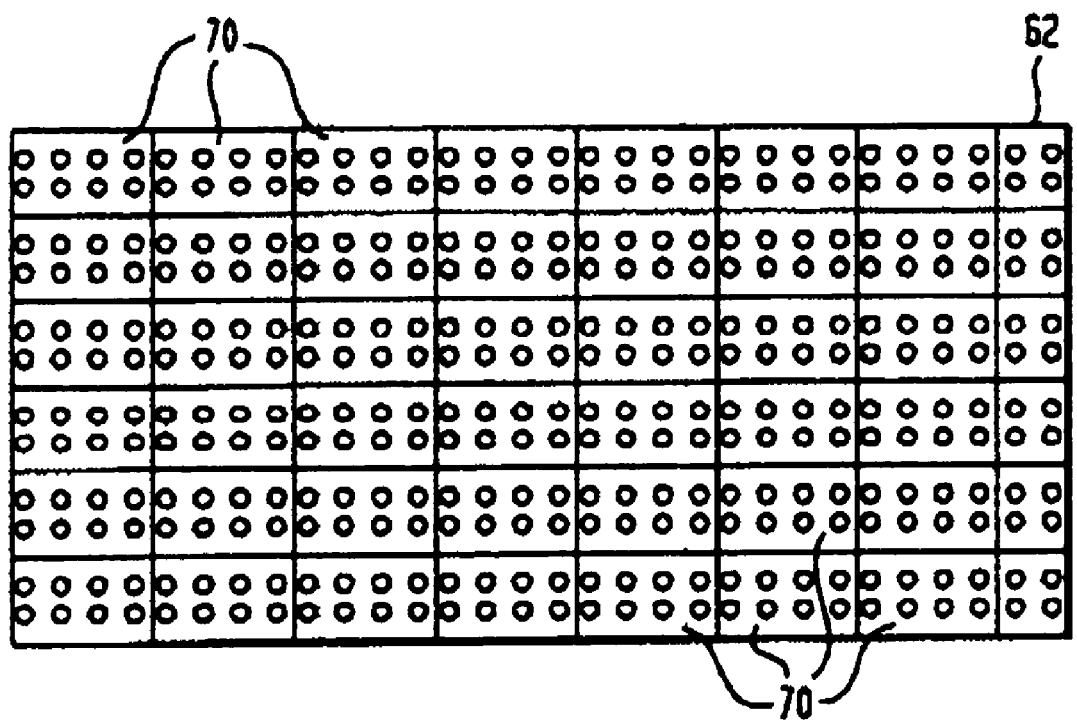
FIG. 5 is a side view of the filter of the alternative embodiment.

The filter 62 may be a variety of differing filters and the one that is shown is made up of a plurality of filter blocks 70 that are illustrated in FIG. 2 along with the perspective view of FIG. 4 and the side view of the completed filter 62 in FIG. 5. As shown in FIG. 4, specifically, the filter blocks 70 are seen to be squared off S-shaped in configuration and each filter block 70 has a plurality of passageways 72 that pass horizontally through the filter blocks 70.

Thus, as illustrated in the top view of FIG. 2 and the side view of FIG. 5, the filter blocks 70 can be interlocked with each other to make up the overall filter 62 in the form of a wall such that the passageways 72 of each block are in alignment with the passageways 72 of adjacent filter blocks 70. Thus, the horizontal passageways 72 provide a path for the water to pass from the upstream side 64 of the filter 62 to the downstream side 66 while filtering out undesirable material, such that the water can be safely discharged into the groundwater through the groundwater conveyance system.

Those skilled in the art will readily recognize numerous adaptations and modifications which can be made to the water separation tank of the present invention which will result in an improved water treatment system, yet all of which will fall within the scope and spirit of the present invention as defined in the following claims. Accordingly, the invention is to be limited only by the following claims and their equivalents.

I claim:

1. A separation tank for treating a flowing stream of water, said separation tank comprising:
    a container having a bottom, sidewalls and a cover,
    an inlet formed in one of said sidewalls of said container to allow water to pass into said container,
    an outlet formed in another of said sidewalls of said container to allow water to pass out of said container;
    a low flow treatment path to treat water passing from said inlet to said outlet through said low flow treatment path, said low flow treatment path having a low flow treatment means to remove both floating and non-floating material from the water passing through said low flow treatment path,
    a high flow treatment path to treat water passing from said inlet to said outlet through said high flow treatment path, said high flow treatment path having a high flow treatment means to remove both floating and non-floating material from the water passing through said high flow treatment path, and
    an opening located at a predetermined height between said low flow treatment path and said high flow treatment path to allow water exceeding a predetermined flowrate to flow over said opening to pass said water from said low flow treatment path into said high flow treatment path when the height of the water exceeds the predetermined height.

2. The separation tank as defined in claim 1 wherein said low flow treatment path comprises a first treatment chamber and a second treatment chamber, and said low flow treatment means includes a partition separating said first treatment chamber from said second treatment chamber, said partition having at least one opening located at a predetermined height above the bottom of said container to allow water to flow through said at least one opening while preventing non-floating materials from passing from said first treatment chamber into said second treatment chamber.

3. The separation tank as defined in claim 2 wherein said at least one opening in said partition separating said first treatment chamber from said second treatment chamber has at least two openings with one of said at least two openings being vertically spaced above the other of said at least two openings.

4. The separation tank as defined in claim 2 wherein said low flow treatment means further includes a partition separating said second treatment chamber from said outlet, said partition having at least one standpipe affixed thereto extending downward to a lower inlet that is located a predetermined height above the bottom of said container to allow water to flow through said at least one standpipe while preventing floating materials from passing from said second treatment chamber to said outlet.

5. The separation tank as defined in claim 2 wherein said container further comprises a filter/recharge chamber having a filter contained therein to filter water from said second treatment chamber and to discharge at least some of that filtered water into the surrounding ground by means of a groundwater conveyance system.

6. The separation tank as defined in claim 5 wherein said groundwater conveyance system comprises at least one perforated pipe.

7. The separation tank as defined in claim 2 wherein said container further comprises a filter/recharge chamber having a filter contained therein to filter water from said second treatment chamber and to discharge at least some of that filtered water to said outlet chamber.

8. The separation tank as defined in claim 2 wherein said container further comprises a filter/recharge chamber that receives water from said second treatment chamber and channels at least some of the water from said second treatment chamber to said outlet chamber.

9. The separation tank as defined in claim 2 wherein said container further comprises a filter/recharge chamber that receives water from said second treatment chamber and discharges at least some of that water into the surrounding ground by means of a groundwater conveyance system.

10. The separation tank as defined in claim 1 wherein said high flow treatment means comprises a high baffle to prevent floating materials from passing said high baffle and a low baffle to prevent non-floatable material from passing said low baffle.

11. The separation tank as defined in claim 1 wherein said opening located between said low flow treatment path and said high flow treatment path is a high flow weir wherein the water exceeding the predetermined flow passes over said high flow weir.

12. A separation tank for treating a flowing stream of water, said separation tank comprising:
    a container having a bottom, sidewalls and a cover and having formed therein a low flow treatment path and a high flow treatment path,
    an inlet formed in one of said sidewalls of said container to allow water to enter said container,
    an outlet formed in another of said sidewalls of said container to allow water to be discharged from said container;
    said low flow treatment path and said high flow treatment path extending from said inlet to said outlet,
    a low flow treatment means in said low flow treatment path to prevent non-floatable materials from passing through the low flow path to said outlet,
    a low flow treatment means in said low flow treatment path to prevent floatable materials from passing through the low flow path to said outlet,
    an opening located at a predetermined height between said low flow treatment path and said high flow treatment path to allow water exceeding a predetermined flow rate to flow over said opening to pass said water from said low flow treatment path into said high flow treatment path when the height of the water exceeds the predetermined height;
    a treatment means in said high flow treatment path to prevent non-floatable materials and floatable materials from passing through the high flow path to said outlet,
    a filter/recharge chamber formed in said low flow treatment path, said filter/recharge chamber having a filter, said filter having an upstream side receiving the water and discharging the water at a downstream side after passing through the filter.

13. The separation tank as defined in claim 12 wherein said filter/recharge includes a groundwater conveyance system to allow at least some of the water discharged from the downstream side of said filter to pass out of said container.

14. The separation tank as defined in claim 13 wherein said groundwater conveyance system comprises at least one perforated pipe extending outwardly from said filter/recharge chamber.

15. The separation tank as defined in claim 12 wherein said low flow treatment path includes a partition across said low flow treatment path, said partition having at least one opening therein, said at least one opening being vertically positioned so as to prevent non-floatable particles from passing through said low flow treatment path to said outlet.

16. The separation tank as defined in claim 12 wherein said low flow treatment path includes a partition across said low flow treatment path, said partition having at least one standpipe affixed thereto having a lower end extending downwardly into the water flowing through said low flow treatment path to prevent floatable materials from passing through said low flow treatment path to said outlet.

17. The separation tank as defined in claim 12 wherein said opening located between said low flow treatment path and said high flow treatment path comprises an upper weir located at a predetermined height to allow water exceeding a predetermined flow rate to flow over said weir to pass said water from said low flow treatment path into said high flow treatment path.

18. The separation tank as defined in claim 12 wherein said treatment means in said high flow treatment chamber comprises a high baffle and a low baffle wherein floatable materials are prevent from passing by said high baffle and non-floatable materials are prevented from passing by said low baffle.

19. The separation tank as defined in claim 12 wherein said filter comprises a wall having a plurality of passageways through said wall extending from said upstream side to said downstream side.

20. The separation tank as defined in claim 12 wherein said filter comprises a plurality of filter blocks having a plurality of passageways through each filter block extending from said upstream side to said downstream side.

21. The separation tank as defined in claim 20 wherein said filter blocks are squared S configurations and can be interlocked together to form a plurality of adjacent filter blocks, wherein the plurality of said passageways of one filter block align with the plurality of passageways of an adjacent filter block to create a continuous path for water to pass through said filter.

22. The separation tank as defined in claim 12 wherein at least some of the water at the downstream side of said filter is adapted to pass to said outlet.

23. A method of treating a stream of water by means of a separation tank, said method comprising the steps of:
providing a container having a bottom, side walls, a cover, an inlet for allowing water to enter the container and an outlet for discharging water from the container, said container having a low flow treatment path for water to pass from the inlet to the outlet and a high flow treatment path for water to pass from the inlet to the outlet;
conveying water through the inlet into the container;
treating the water passing through the low flow treatment path to remove floatable and non-floatable materials;
conveying the water that exceeds a predetermined flow rate from the low flow treatment path into the high flow treatment path by passing the water over an opening located at a predetermined height;
treating the water passing through the high flow treatment path to remove floatable and non-floatable materials, and
discharging the water from the container through the outlet.

24. The method of claim 23 wherein the step of conveying the water from the low flow treatment path into the high flow treatment path comprises passing the water over a weir at a predetermined height.

25. The method of claim 23 wherein the step of treating the water as the water passes through the low flow treatment path includes passing the water through an opening located a predetermined height above the floor to prevent non-floatable materials from passing through the low flow treatment path to the outlet.

26. The method of claim 23 wherein the step of treating the water as it passes through the low flow treatment path comprises passing the water through a standpipe having a lower inlet located below the level of water to prevent floatable materials from passing through the low flow treatment path to the outlet.

27. The method of claim 23 wherein the method further comprises the step of filtering at least some of the water passing through the low flow path and discharging at least some of that filtered water through a groundwater conveyance system.

28. The method of claim 23 wherein the method further comprises the step of conveying at least some of the water passing through the low flow path through a groundwater conveyance system.

29. The method of claim 23 wherein the method further comprises the step of filtering at least some of the water passing through the low flow path and discharging at least some of that filtered water to the outlet.

* * * * *